Nov. 21, 1939.  S. A. SNELL  2,180,617
HANDLEBAR STRUCTURE
Filed March 21, 1938  3 Sheets—Sheet 1

INVENTOR
SAMUEL A. SNELL
BY
Whittemore Hulbert & Belknap
ATTORNEYS

Nov. 21, 1939.  S. A. SNELL  2,180,617
HANDLEBAR STRUCTURE
Filed March 21, 1938  3 Sheets-Sheet 2
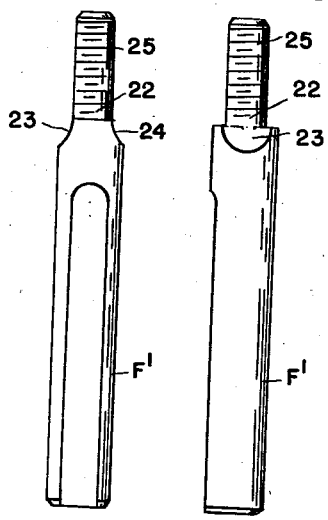
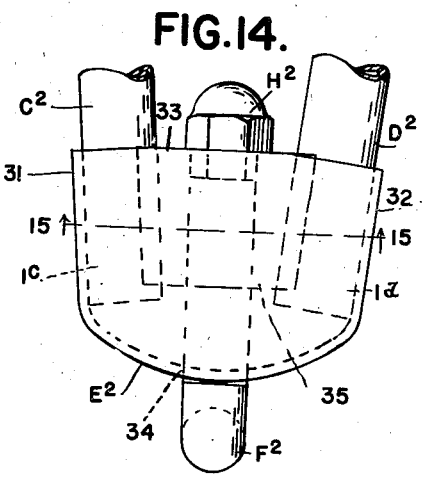
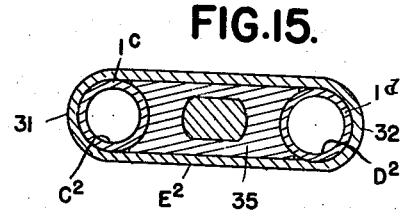
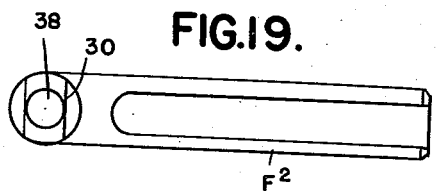
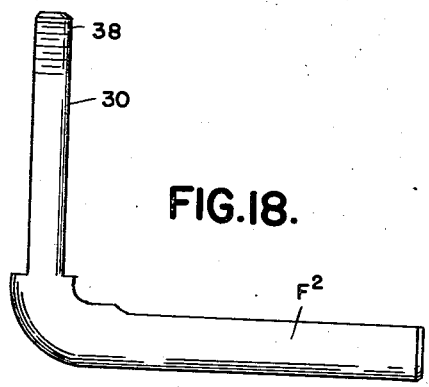
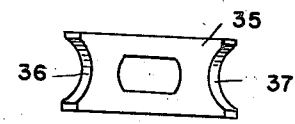
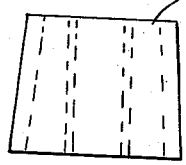
*INVENTOR*
SAMUEL A. SNELL
BY
*ATTORNEYS*

Nov. 21, 1939. S. A. SNELL 2,180,617
HANDLEBAR STRUCTURE
Filed March 21, 1938 3 Sheets-Sheet 3
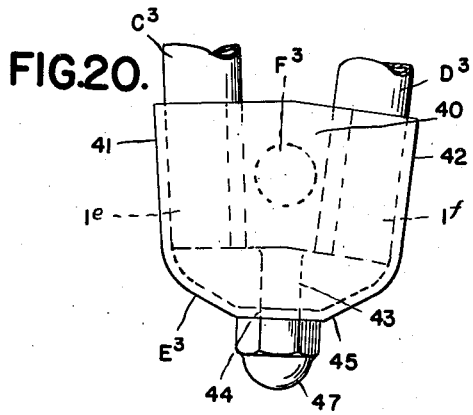
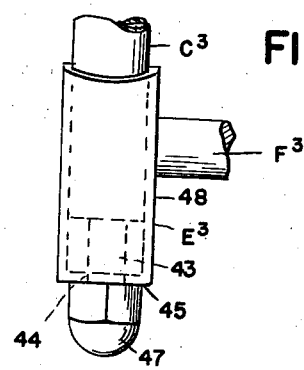
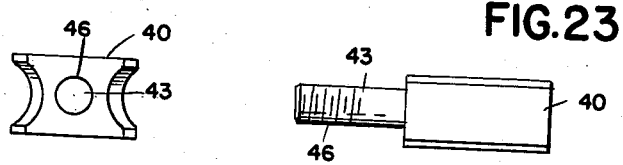
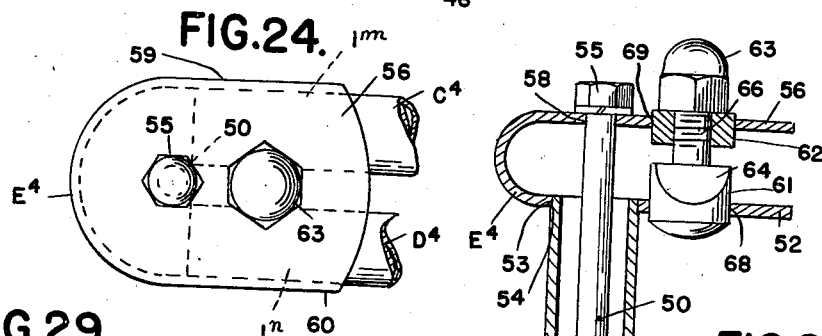
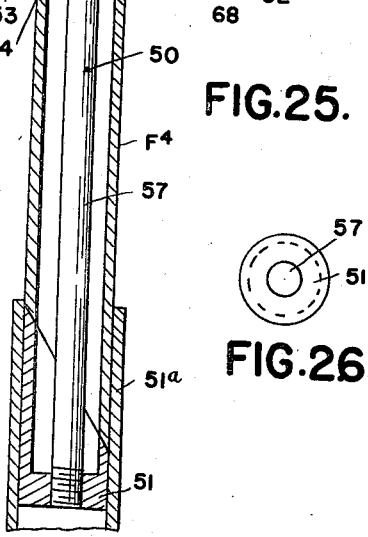
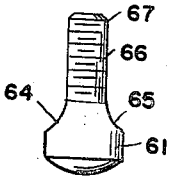
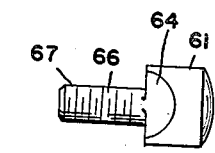
INVENTOR
SAMUEL A. SNELL
BY
ATTORNEYS Patented Nov. 21, 1939

2,180,617

UNITED STATES PATENT OFFICE 2,180,617

HANDLEBAR STRUCTURE

Samuel A. Snell, Toledo, Ohio, assignor to The American-National Company, Toledo, Ohio, a corporation of Ohio Application March 21, 1938, Serial No. 197,290

12 Claims. (Cl. 74—551.1)

This invention relates generally to handlebar constructions and refers more particularly to those designed for velocipedes and the like.

One of the essential objects of the invention is to provide a handlebar of this type wherein the hand grips have supporting arms that are adjustable relative to each other.

Another object is to provide a handlebar wherein the relatively adjustable arms have a common support adapted to be mounted upon the front fork of a velocipede.

Another object is to provide an efficient means, preferably in association with the common support aforesaid, to hold the relatively adjustable arms in adjusted position.

Another object is to provide a handlebar that is simple in construction, economical to manufacture and install and pleasing in appearance.

Other objects, advantages and novel details of construction of this invention will be made more apparent as this description proceeds, especially when considered in connection with the accompanying drawings, wherein:

Figure 10 is a top plan view of the thrust member illustrated in Figure 9;

Figure 11 is an edge elevation of the thrust member shown in Figure 10;

Figure 12 is a side elevation of the stem illustrated in Figure 9;

Figure 13 is an edge elevation of the stem illustrated in Figure 12;

Figure 14 is a fragmentary top plan view of another modification;

Figure 15 is a sectional view taken substantially on the line 15—15 of Figure 14;

Figure 16 is an end elevation of the wedge illustrated in Figures 14 and 15;

Figure 17 is a top plan view of the wedge;

Figure 18 is an elevation of the stem illustrated in Figure 14;

Figure 19 is an edge elevation of the stem illustrated in Figure 18;

Figure 20 is a fragmentary top plan view of another modification;

Figure 21 is an edge elevation of the structure illustrated in Figure 20;

Figure 22 is an end elevation of the wedge illustrated in Figure 20;

Figure 23 is a side elevation of the wedge illustrated in Figure 22;

Figure 24 is a fragmentary top plan view of another modification;

Figure 25 is a vertical sectional view through the structure illustrated in Figure 24;

Figure 26 is a bottom plan view of the post illustrated in Figure 25;

Figure 27 is a detail view of the wedge illustrated in Figure 25;

Figure 28 is an edge elevation of the wedge illustrated in Figure 27;

Figure 29 is a top plan view of the thrust member illustrated in Figure 25;

Figure 30 is an edge elevation of the thrust member illustrated in Figure 29.

Figure 1:
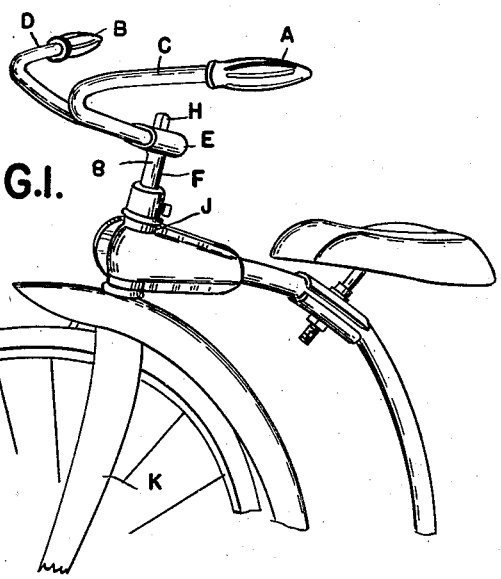
Figure 1 is a fragmentary perspective view of a velocipede equipped with a handlebar structure embodying my invention.
Figure 3:
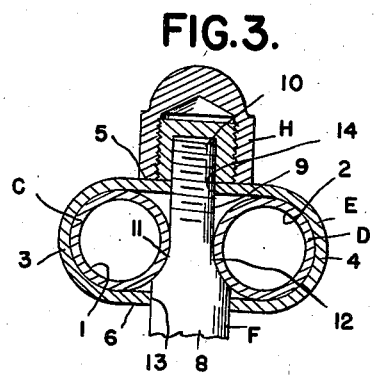
Figure 3 is a vertical sectional view taken substantially on the line 3—3 of Figure 1.
Figure 2:
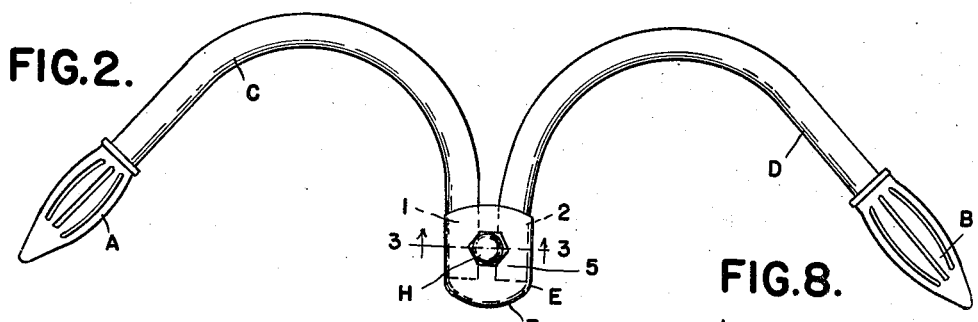
Figure 2 is a top plan view of the handlebar assembly.
Figure 6:
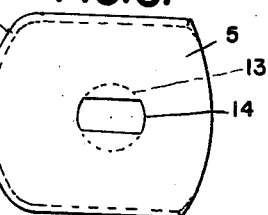
Figure 6 is a top plan view of the housing.

Referring now to the drawings, A and B are the hand grips, C and D are the supporting arms therefor, E is a housing for the adjacent inner ends of said arms, F is a supporting stem, and H is a clamping member of a handlebar embodying my invention.

As shown, the grips A and B are preferably formed of rubber or rubber composition and are sleeved upon the outer ends of the arms C and D. In the present instance, these arms C and D are separate tubes that are substantially U-shaped in plan and have substantially straight inner ends 1 and 2, respectively, arranged in substantially parallel relation within the housing E. Preferably this housing E forms the centerpiece of the handlebar and is pressed from sheet metal. To cooperate with the stem F and clamping member H for holding the arms C and D, the housing E is provided with curved side walls 3 and 4, respectively, which are substantially concentric with and form bearings for the straight ends 1 and 2 of the arms and has substantially flat parallel top and bottom walls 5 and 6, respectively. The housing E has a rounded closed rear end 7 and is open at its forward end. The stem F has a cylindrical body 8 provided at its upper end with a flattened portion 9 having an exteriorly threaded upper end 10. At the juncture of said cylindrical and flattened portions 8 and 9 the stem is provided at diametrically opposite sides with curved wedging portions 11 and 12 that extend inwardly from the periphery of the cylindrical portion 8 to and merge with the flattened portions 9. When the stem F is assembled with the other parts, the cylindrical portion 8 is received in a suitable opening 13 in the lower wall 6 of the housing, the curved wedging portions 11 and 12 are between and in engagement with the straight portions 1 and 2 of the tubular arms, and the exteriorly threaded portion 10 is received in a suitable opening 14 in the top wall 5 of the housing so as to be engaged by the clamping member H. Preferably this member H is in the form of a nut that engages and is adjustable on the threaded portion 10 of the stem. The cylindrical portion 8 of the stem is adapted to telescopically engage and be suitably secured to a tubular shank J of a front fork K of a velocipede. Thus, by loosening the nut H either or both arms C and D may be adjusted to raise or lower the grips A and B as desired. When the nut H is tightened the arms C and D are not only held in adjusted position, but also will be effectively held against rattling.

Figure 8:
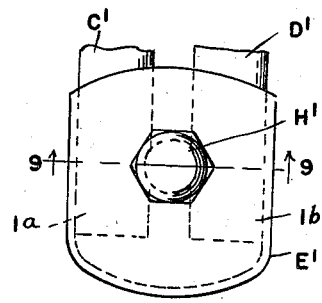
Figure 8 is a fragmentary top plan view of a slight modification.
Figures 4, 5:
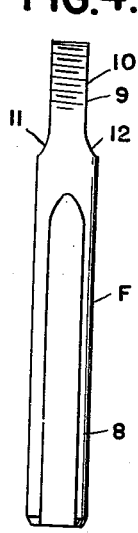
Figure 4 is an edge elevation of the handlebar stem.
Figure 5 is a side elevation of the handlebar stem illustrated in Figure 4.
Figure 7:
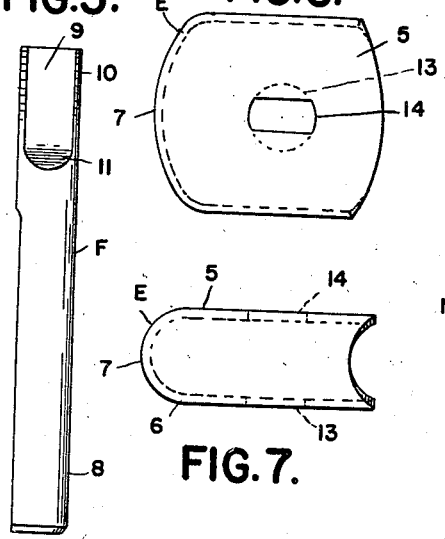
Figure 7 is an edge elevation of the housing illustrated in Figure 6.
Figure 9:
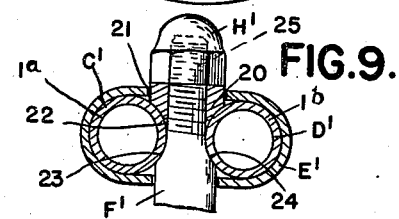
Figure 9 is a vertical sectional view taken substantially on the line 9—9 of Figure 8.

In Figures 8 to 13, inclusive, I have illustrated a slight modification in which a thrust member 20 is used with the stem F' and nut H' to hold the arms C' and D' in position within the housing E'. In this construction the opening 21 in the upper wall of the housing is large enough to receive the thrust member 20, which as shown is sleeved on the flattened portion 22 of the stem and is provided at diametrically opposite sides with curved wedging portions 23 and 24 respectively that engage the straight ends 1ᵃ and 1ᵇ of the tubular arms C' and D'. The nut H' is adjustable on the threaded end 25 of the stem against the thrust member 20 to cause the arms C' and D' to be held in adjusted position.

In Figures 14 to 19, inclusive, I have illustrated another modification in which the straight inner ends 1ᶜ and 1ᵈ respectively of the tubular arms C² and D² converge toward a horizontal flattened portion 30 of a stem F². In this construction the side walls 31 and 32 of the housing E² also converge from the open to the closed ends 33 and 34 respectively thereof so as to form side bearings for said arms C² and D², and a wedge-shaped block 35 is non-rotatably sleeved upon the flattened horizontal portion 30 of the stem and has grooved longitudinal edges 36 and 37 respectively that engage and cooperate with the side walls 31 and 32 of the housing to hold the straight portions 1ᶜ and 1ᵈ of the arms in adjusted position. The forward end 38 of the horizontal portion 30 of the stem is threaded and is engaged by a nut H². Thus, by tightening this nut H² against block 35, the latter will be forced toward the closed end 34 of the housing. As a result, the straight portions 1ᶜ and 1ᵈ of the arms will be clamped tightly against the sides 31 and 32 of said housing and effectively held in place.

In Figures 20 to 23, inclusive, I have illustrated another modification in which a wedge-shaped block 40 somewhat similar to the block 35 is used between the straight converging portions 1ᵉ and 1ᶠ of the arms C³ and D³ to hold said arm portions against the side walls 41 and 42, respectively, of the housing E³. In this construction the block 40 is free of the stem F³ and is provided at its rear end with a cylindrical shank 43 that extends freely through a suitable hole 44 in the closed end 45 of the housing and is provided with an exteriorly threaded end 46. A nut 47 is adjustable on said threaded end 46 upon the outside of the housing to actuate the block 40 for clamping purposes. The supporting stem F³ is entirely beneath and is rigid with the bottom wall 48 of the housing.

In Figures 24 to 29, inclusive, I have illustrated another modification in which the housing E⁴ is clamped upon the upper end of a tubular post F⁴ by means of a bolt 50 that extends through the housing E⁴ and threadedly engages a wedge 51 within the upright portion 51ᵃ of the fork. Preferably the lower wall 52 of the housing has an opening 53 receiving the upper end of the post and rests upon a suitable shoulder 54 thereof. The head 55 of the bolt is disposed above the top wall 56 of the housing, and the stem 57 of said bolt extends through an opening 58 in said top wall and axially of the post F⁴. In this construction the straight portions 1ᵐ and 1ⁿ of the arms C⁴ and D⁴ are substantially parallel and engage substantially parallel side walls 59 and 60 of the housing. For holding these arms I have provided a wedge 61, a thrust member 62 and a clamping nut 63. As shown, the wedge 61 comprises a cylindrical body having curved wedging portions 64 and 65, respectively, at diametrically opposite sides thereof and having a cylindrical stem 66 provided with an exteriorly threaded end 67. Preferably the cylindrical body of the wedge 61 engages an opening 68 in the lower wall 52 of the housing, the thrust member 62 engages an opening 69 in the upper wall 56 of said housing and is sleeved on the stem 66, and the nut 63 is adjustable on the threaded end 67 of the stem above the upper wall 56 of the housing. The thrust member 62 is an annulus and is provided at diametrically opposite sides thereof with curved wedging portions 70 and 71 that engage the straight portions 1ᵐ and 1ⁿ of the arms C⁴ and D⁴. Thus, when the nut 63 is tightened, the arms C⁴ and D⁴ will be effectively clamped by the thrust member 62 and wedge 61 against the side walls 59 and 60 of the housing.

What I claim as my invention is:

1. In a handlebar assembly, a pair of individually adjustable handlebar arms having substantially straight cylindrical portions disposed in laterally spaced relation, a hollow housing for the straight portions of said arms having curved side walls substantially concentric with and forming bearings for the straight cylindrical portions of said arms, and a supporting stem extending between and having means for wedging said straight arm portions laterally against the curved side walls of said housing.

2. In a handlebar assembly, a pair of individually adjustable handlebar arms having substantially straight cylindrical portions disposed in laterally spaced relation, a hollow housing for the straight portions of said arms having curved side walls substantially concentric with and forming bearings for the straight cylindrical portions of said arms, and means between the straight portions of said arms and movable at substantially right angles to the axes thereof for wedging said straight portions laterally against the curved side walls of said housing.

3. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially aligned openings, a supporting stem having a portion in the opening in the bottom wall of said housing and having an exteriorly threaded flattened portion extending upwardly through the opening in the top wall of said housing, said stem being provided between the portions thereof just mentioned with curved wedging portions disposed between the straight portions of the arms in said housing and adapted to force said straight portions laterally against the curved side walls of the housing, and a clamping member adjustable on the exteriorly threaded portion of said stem relative to the top wall of said housing to cause the straight portions of said arms to be forced by said curved wedging portions against the curved side walls of the housing.

4. In a handlebar assembly, a pair of individually adjustable handlebar arms having substantially straight portions arranged in laterally spaced relation, a housing for the straight portions of said arms, said housing having side walls forming bearings for the straight portions of said arms, said housing having substantially flat parallel top and bottom walls provided with substantially aligned openings, a supporting stem having a portion in the opening in the bottom wall of said housing and having an exteriorly threaded portion extending through the opening in the top wall of said housing, said stem being provided between the portions thereof just mentioned with curved wedging portions disposed between the straight portions of the arms in said housing and adapted to force said straight portions laterally toward the side walls of the housing, a thrust member sleeved on the stem within the opening in the top wall of the housing and having curved wedging portions between and adapted to cooperate with the curved wedging portions aforesaid to force the straight portions of the arms toward the side walls of the housing, and a clamping member adjustable on the exteriorly threaded portion of said stem relative to the thrust member to cause the straight portions of said arms to be forced by both sets of curved wedging portions against the side walls of the housing.

5. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially aligned openings, and means for urging the straight portions of said arms laterally into binding engagement with the curved side walls of said housing, including a member in the opening in the bottom wall of said housing having seats for both arms, and means in the opening in the top wall of said housing for actuating both arms on said seats.

6. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially aligned openings, and means for urging the straight portions of said arms laterally into binding engagement with the curved side walls of said housing, including a supporting stem having portions in said aligned openings and provided between said portions with curved portions forming seats for the straight portions of said arms, and means for moving the arms on said seats including a wedge slidable on said stem and engaging both arms, and actuating means for said wedge engaging said stem above the top wall of said housing.

7. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially alinged openings, a stem extending through said aligned openings and provided between said parallel walls with curved portions forming both supporting seats and wedges for the straight portions of said arms, and means for moving said arms on said seats as aforesaid including an adjustable member engaging said stem above the top wall of said housing.

8. In a handlebar assembly, a pair of individually adjustable handlebar arms having substantially straight cylindrical portions disposed in laterally spaced relation, a hollow housing for the straight portions of said arms having curved side walls substantially concentric with and forming bearings for the straight cylindrical portions of said arms, said housing having substantially parallel top and bottom walls provided with substantially aligned holes, and means for urging the straight portions of said arms laterally into binding engagement with the curved walls of said housing, including a supporting stem extending through said aligned holes and provided between said parallel walls with seats for the straight portions of said arms.

9. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially aligned openings, a stem extending through said aligned openings and provided between said parallel walls with curved portions forming both supporting seats and wedges for the straight portions of said arms, and means for moving said arms on said seats as aforesaid including a member adjustable on said stem against the top wall of said housing.

10. In a handlebar assembly, a pair of individually adjustable handlebar arms having substantially straight cylindrical portions disposed in laterally spaced relation, a hollow housing for the straight portions of said arms having curved side walls substantially concentric with and forming bearings for the straight cylindrical portions of said arms, a supporting stem extending between and having means for wedging said straight arm portions laterally against the curved side walls of said housing, and means engaging said stem and adapted to cooperate therewith for causing the straight arm portions to be wedged laterally against the curved side walls of the housing.

11. In a handlebar assembly, a pair of individually adjustable handlebar arms having substantially straight cylindrical portions disposed in laterally spaced relation, a hollow housing for the straight portions of said arms having curved side walls substantially concentric with and forming bearings for the straight cylindrical portions of said arms, and means for moving said straight arm portions laterally against the curved side walls of said housing including wedging means between the straight portions of said arms and movable at substantially right angles to the axes thereof, and adjustable means cooperating with said wedging means to effect the lateral movement aforesaid.

12. In a handlebar assembly, a pair of individually adjustable handlebar arms having substantially straight cylindrical portions disposed substantially parallel to each other, a housing for the straight portions of said arms, said housing having curved side walls substantially concentric with and forming bearings for the straight cylindrical portions of said arms, said housing having substantially flat parallel top and bottom walls provided with substantially aligned openings, and means for urging the straight portions of said arms laterally into binding engagement with the curved side walls of said housing, including a supporting stem having portions in said aligned openings and provided between said portions with curved portions forming seats for the straight portions of said arms, and means above the top wall of said housing and adjustable relative to said stem for actuating both arms on said seats as aforesaid.

SAMUEL A. SNELL.